(No Model.) 3 Sheets—Sheet 1.
E. RICHTER.
UTILIZING ELECTRIC MOTORS FOR OPERATING MACHINERY.
No. 528,608. Patented Nov. 6, 1894.
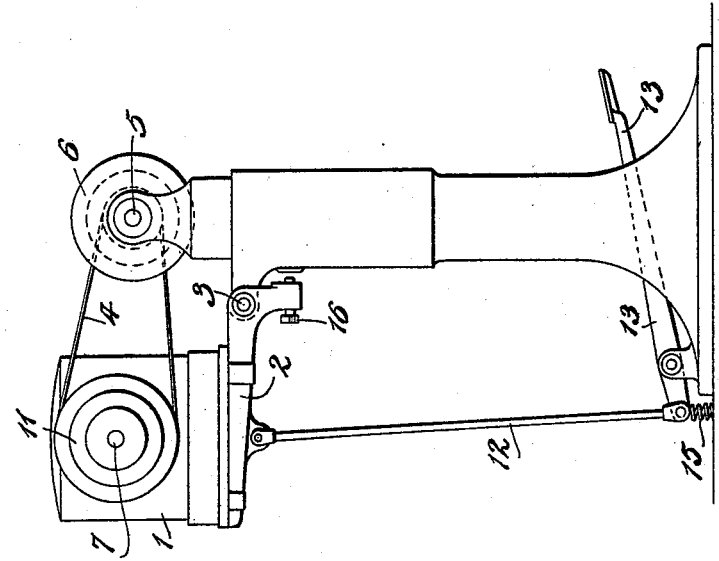
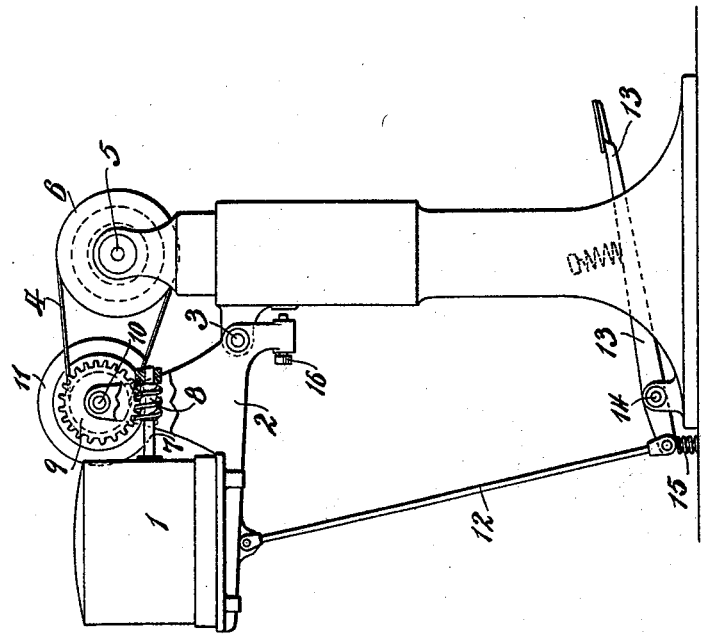
WITNESSES:
INVENTOR
Ernst Richter
BY
Benjamin
ATTORNEY

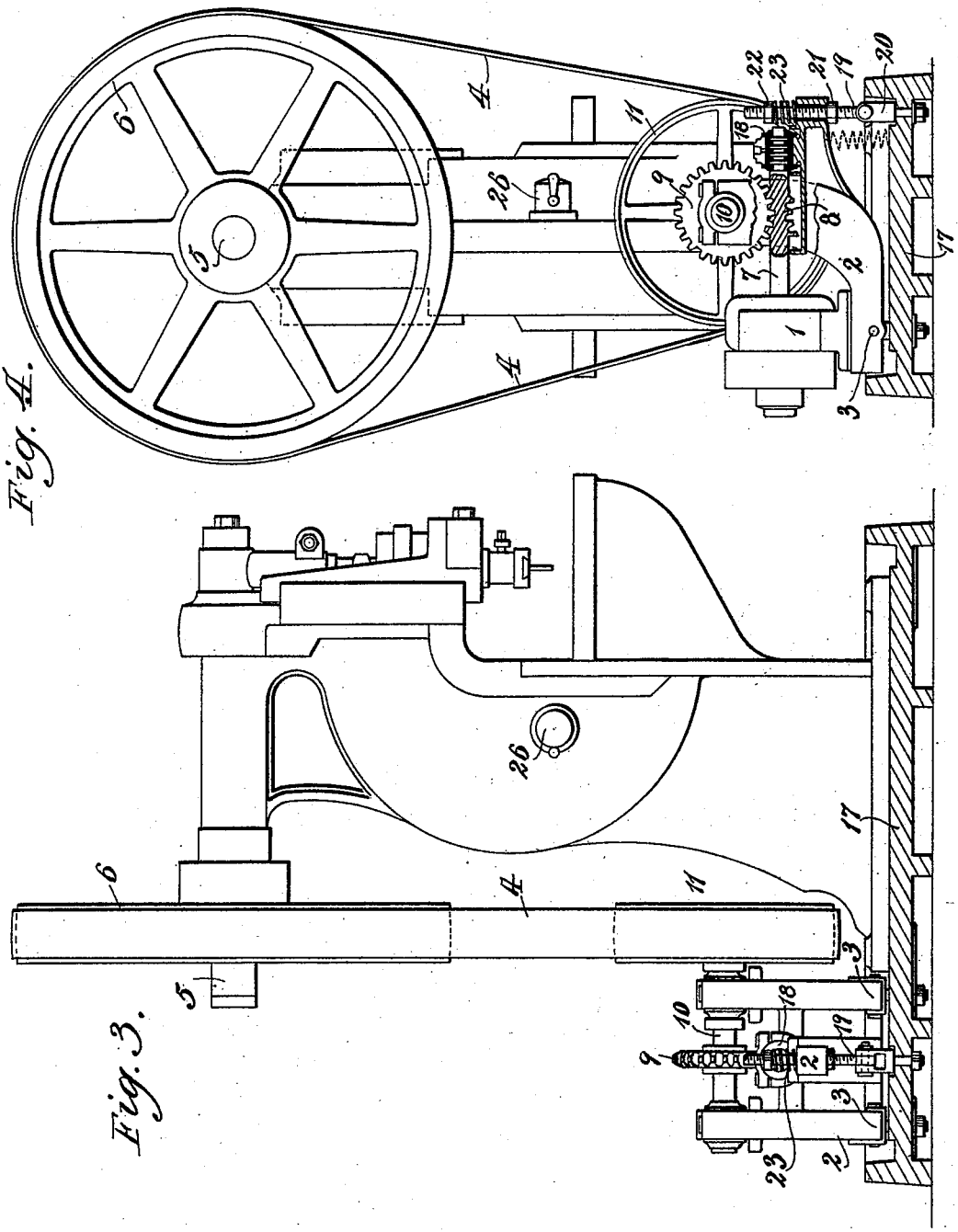

(No Model.) 3 Sheets—Sheet 3.
E. RICHTER.
UTILIZING ELECTRIC MOTORS FOR OPERATING MACHINERY.
No. 528,608. Patented Nov. 6, 1894.
Fig. 5.
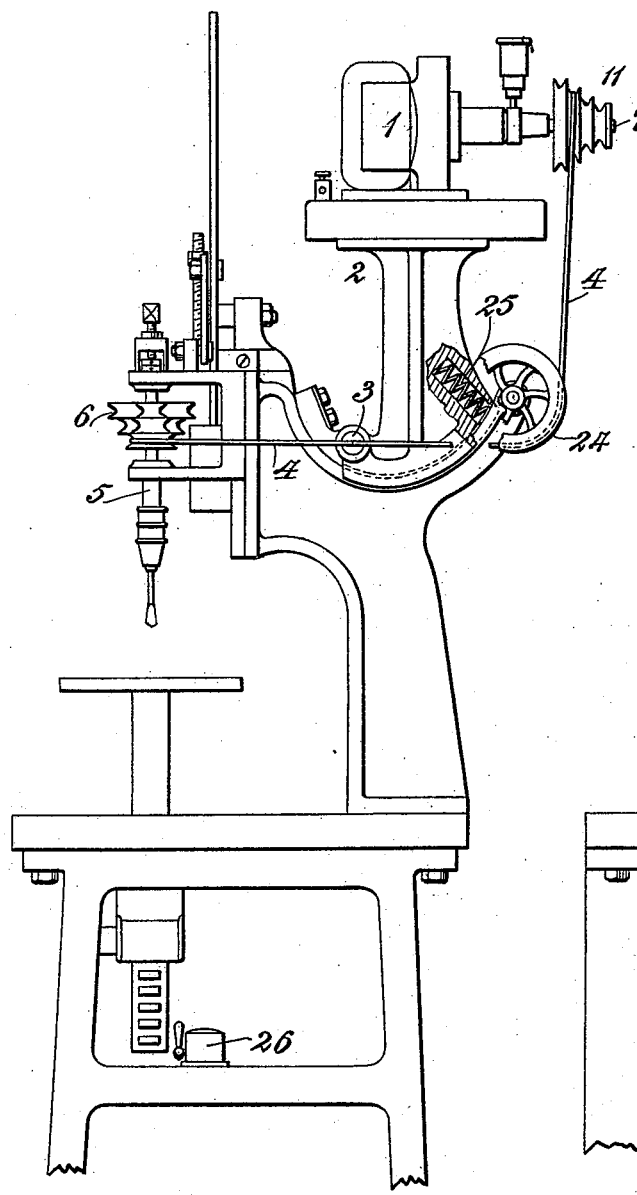
Fig. 6.
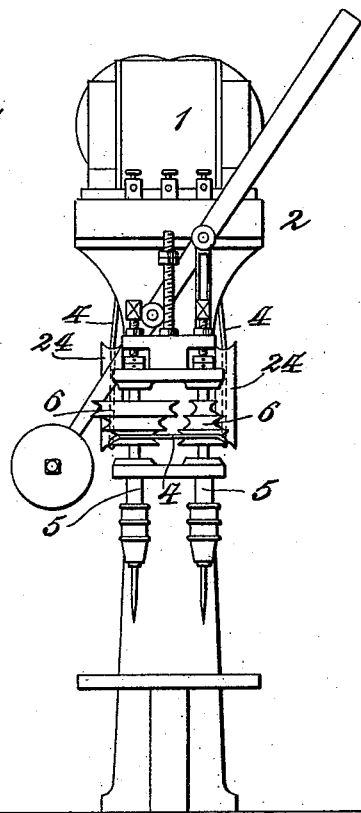
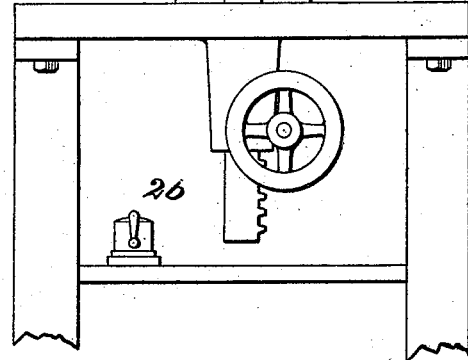
WITNESSES:
John M. Deemer
Alvin K. Goodwin
INVENTOR
Ernst Richter
BY
Geo. H. Benjamin
ATTORNEY

UNITED STATES PATENT OFFICE.

ERNST RICHTER, OF BERLIN, GERMANY, ASSIGNOR TO SIEMENS & HALSKE, OF SAME PLACE.

UTILIZING ELECTRIC MOTORS FOR OPERATING MACHINERY.

SPECIFICATION forming part of Letters Patent No. 528,608, dated November 6, 1894.

Application filed May 31, 1893. Serial No. 476,063. (No model.)

*To all whom it may concern:*

Be it known that I, ERNST RICHTER, a subject of the King of Prussia, German Emperor, residing at the city of Berlin, Kingdom of Prussia, German Empire, have invented new and useful Improvements in Utilizing Electric Motors for Operating Machinery, of which the following is a specification.

The present invention relates to the utilization of electric motors for operating machinery and is auxiliary to the broad generic invention set forth in United States Patent No. 496,567, granted May 2, 1893, to Carl Hoffmann and myself. In this prior invention an electric motor is sustained in movable relation to the power machine operated by it and the weight or gravity of the motor is availed of to transmit power to the driven machine by means of flexible appliances which may be modified by bodily movement of the motor, whereby any desired speed may be given the driven machine or apparatus without appreciably or injuriously slackening or varying the speed of the electric motor and thereby assuring that the motor shall maintain a practically uniform speed conducive to the best operative results.

The prior generic invention as disclosed in the prior patent aforesaid includes or comprises the combination with a power machine, of an electric motor, interposed mechanism for transmitting the power of the motor to the power machine, and means for varying the energy transmitted without varying the speed of the motor, which means consists of mechanism which acts to modify the effective weight of the motor and thereby effect alterations in the speed of the power machine. It also includes broadly the combined elements of a power machine, an electric motor and frictional transmission gear, the motor being movable in its relation to the power machine to modify the transmission gear and thereby vary the speed of the power machine without varying the speed of the electric motor.

It will be apparent from the following description that the present invention is tributary to the prior generic invention in the features above recited and in other features. Nevertheless it will hereinafter appear that the present invention is generic in or to its own class and is important because it has marked advantages as regard increased simplicity and efficiency of operation and inexpensiveness in application to a large variety of machines.

The present invention comprises or embraces a construction and adaptation of electrical and mechanical agencies whereby the electric motor is sustained on the same pivoted platform or frame with the intermediate driving gearing or mechanism, which thus, with the motor, has a movable relation with or to the secondary driving shaft or part of the power machine actuated by or from the motor by flexible power transmitting means, and whereby but one pivoted platform or frame is required to sustain both the motor and the intermediate driving gearing.

The invention will first be described and then will be defined in claims hereinafter set forth.

Reference is to be had to the accompanying drawings forming part of this specification and in which similar reference numerals indicate substantially corresponding parts in the several views.

Figure 1 is a side view partly broken away and in section, of a small pedestal machine having a horizontally disposed rotative work spindle or shaft operative by worm gearing interposed between the electric motor and the belt or flexible power transmitting means, and arranged in accordance with my invention. Fig. 2 is a similar view wherein the machine spindle is operated at higher speed and directly by a belt from a parallel shaft of the electric motor. Fig. 3 is a side view of an eccentric drop press or punch operated by an electric motor and embodying my invention, the floor bed-plate of the press being in section. Fig. 4 is a rear elevation of the drop press and electric motor, partly in vertical section. Fig. 5 is a side elevation, partly in section of a two-spindle drilling machine adapted for operation by an electric motor in accordance with my invention, and Fig. 6 is a front view thereof.

The varied character of the machines shown in the drawings and the various adjustments of the electric motors operating them, prove the generic character of my invention, which I now will describe.

In each and every adaptation of the invention, the electric motor 1, is sustained on a platform or bed-plate 2, which is pivoted at 3, either to the pedestal or bed of the machine to be operated or to the floor, and the intermediate driving gearing is sustained on the platform or bed-plate of the motor.

The electric motor may have any approved construction and may be speeded to accommodate the machine it is to operate. The intermediate driving gearing is connected by a suitable flexible power transmitting means or medium, preferably a belt 4, with the operative shaft or part 5, of the machine to be driven, said part or parts 5, comprising with a driving pulley or pulleys 6, what I term the secondary driving means whereby the operative spindle or part of the power machine is actuated.

In Fig. 1 of the drawings, the shaft 7, of the electric motor ranges about at right angles to the work spindle or shaft 5, of the power machine, and a worm 8, on shaft 7, engages a worm gear wheel 9, fast on a shaft 10, to which is fixed a cone pulley 11, which is a counterpart of the cone pulley 6, on the shaft 5, of the machine. Over these pulleys 11, 6, the flexible power transmitting belt 4, passes to operate the power machine from the electric motor and at a lower speed of rotation than the motor driving shaft, due to the interposition of the worm gearing. A rod 12, pivoted to the motor sustaining platform 2, is linked at its lower end to the short arm of a treadle lever 13, which is fulcrumed at 14, to the power machine base, or it may be to the floor, and between the treadle and the base or floor is interposed an elastic buffer shown as a spring 15, which partially sustains the overhanging weight of the electric motor and the intermediate driving gearing and their platform and relieves the power transmitting belt 4, of excessive strains. Instead of locating the elastic buffer 15, beneath the short arm of the treadle lever it may be placed between the long arm of said lever and a fixed lug on the machine pedestal, as indicated by dotted lines in the drawings. Any approved means may be used to regulate the tension or resistance of the elastic buffer.

An adjustable screw stop 16, threaded into a projection or bearing of the platform 2, is adapted for contact with the machine pedestal or frame to limit downswing of the platform 2 and the electric motor and intermediate power transmitting gearing thereon, and this adjustable stop 16, may be used to nicely regulate the maximum stress or strain these overhanging parts exert on the power transmitting belt 4.

The operator by regulating the pressure of his foot on the treadle 13, may control to a nicety the tension exerted on the machine pulley 6, by the belt 4, either to impart by the fully tightened belt the maximum speed to the work spindle 5, or to slacken the belt to any extent to impart any desired slower speed to the spindle or to allow it to stop rotating, as the work being done may require, and all without in the least affecting or varying the speed of the electric motor. By sufficient depression of the treadle 13, the belt 4, will be slackened to allow the operator to easily shift said belt on the cone pulleys to regulate the speed of the work spindle of the power machine within limits controlled by the number of belt receiving faces of the pulleys.

The modified machine shown in Fig. 2 of the drawings, is similar in all respects to that shown in Fig. 1, except that the worm gearing is dispensed with and the motor shaft 7, is parallel with the machine work spindle 5, and the cone pulley 11, over which the driving belt 4, passes from the machine pulley 6, is placed directly on the motor shaft 7, this arrangement being desirable when a high speed of the power machine is advantageous. The operation is substantially the same as above described.

The examples of power machines shown in Figs. 1 and 2 of the drawings, show the adaptation of my generic invention to that class of machines such as lathes, drills, buffers and polishers or other machines requiring to be started and stopped frequently to adjust and remove the work. Hence the employment of the treadle to permit this intermittent operation. Figs. 3, 4, 5, and 6, of the drawings however, illustrate the application of my invention to that class of power machines the driving shafts of which are seldom stopped or do not require to be stopped to adjust or remove the work.

In Figs. 3 and 4, is shown an eccentric drop press or punch, on the main driving shaft 5, of which is fixed a pulley 6, to which the belt 4, passes from the single faced pulley 11 on a shaft 10, which is mounted on the platform or bed-plate 2, fulcrumed at 3, to a relatively stationary bed-plate 17, on which the press is supported from the floor. As the speed of this class of machines is not great, the shaft 10, carrying said pulley 11, is geared down to the armature shaft 7, of the electric motor by a worm wheel 9, on the shaft 10, engaging a worm 8, on the shaft 7, and in substantially the same manner shown in Fig. 1 of the drawings. As the worm gearing in Figs. 4 and 5, is required to transmit considerable power from the motor to the machine, the worm gear teeth are shaped to assure constant engagement of all the teeth of the worm 8, with a corresponding number of teeth of the wheel 9. To prevent endwise thrust of the worm shaft 7, 8, on the motor armature said shaft has a series of parallel collars working in corresponding grooves of a box or bearing 18, which is held against endwise movement on the motor platform 2. In this adaptation of the invention, I may use a tension regulated elastic buffer device to sustain the surplus weight of the suspended electric motor over and above that required to maintain proper tension of the belt 4, to operate the press or punch. An approved buffer device comprises a screw bolt 19, which is pivoted to a yoke 20, swiveled in the bed-plate 17, or it may be to the floor. This screw bolt passes freely or loosely through a vertical hole in the pivoted motor platform 2, and receives nuts 21, 22, placed one below the patform and the other above it, and between the upper nut 22, and the platform is placed on the screw a spring 23. By adjusting the nuts on the bolt the action of the spring on the electric motor platform may be regulated to a nicety to maintain proper tension of the belt 4, on the machine pulley 6, or rather to permit the overhanging weight or gravity of the motor to properly influence the driving belt 4, while the spring 23, assures steadiness of operation of both the motor and the power machine.

Dotted lines in Fig. 4 indicate how a spring may be used under the motor platform instead of the screw bolt and buffer spring above described.

In the machine shown in Figs. 5 and 6 of the drawings, there are two vertical rotating spindles or shafts 5, 5, each carrying a chuck and adapted to hold drills, reamers or other light tools operating preferably at a quick and constant speed. In this instance the driving belt 4, passes over the cone pulleys 6, 6, of the work spindles and thence rearward beneath guide pulleys 24, 24, which are journaled on an arm or horn of the power machine frame and thence the belt passes upward to and over the cone pulley 11, on the driving shaft 7, of the electric motor 1. In the motor platform or bed-plate 2, of this apparatus is provided a seat or pocket which receives a suitable expanding elastic medium shown as a spiral spring 25, which by bearing at opposite ends against the platform and the relatively stationary power machine frame normally forces or rocks the platform and electric motor upward on the pivot 3, thereby carrying the motor pulley 11, upward and acting normally to keep the driving belt 4, taut on the motor and power machine pulleys to assure proper non-slipping, cutting or other action of the drills or tools fitted to the power machine spindles 5, 5.

It will be noticed that while in the last above described construction, the electric motor has a movable relation to the power machine, the gravity of the motor does not directly influence the transmission gearing or flexible belt and intermediate driving gearing except as these are acted upon by the interposed elastic medium, which by lifting the motor and its intermediate gearing, tightens the driving belt 4, of the power machine. It will however be seen that in this as in other previously described types of power machines shown in the drawings, the electric motor and the intermediate driving gearing are sustained upon the same pivoted platform or bed-plate, which has a movable relation to the power machine or apparatus driven by the motor, and that the second or intermediate pivoted frame D shown in the prior patent aforesaid and carrying driving gearing interposed between the prime mover of the electric motor and the operative or work spindle or part of the power machine, is dispensed with, and whereby the simplicity, efficiency and comparative inexpensiveness attending the utilization of electric motors for operating various classes of power machines, are promoted.

At 26, is shown a box or casing containing electrical switch devices and within easy reach of the attendant operating the machine. To this switch box the electric wires are coupled in a manner permitting starting or stopping of the motor by cutting it into or out of a line wire circuit.

I claim as my invention—

1. The combination, with a power machine, of an electric motor and independent intermediate driving gearing having conjoint movable relation to the power machine, and power transmission means interposed directly between said intermediate driving gearing of the motor and the driving pulley or part of the power machine.

2. The combination, with a power machine, of a conjointly suspended electric motor and independent intermediate driving gearing, and frictional power transmission means interposed directly between said intermediate gearing and the driving pulley or part of the power machine.

3. The combination, with a power machine, of a conjointly suspended electric motor and independent intermediate driving gearing, frictional power transmission means interposed directly between said intermediate gearing and the driving pulley or part of the power machine, and an elastic buffer device partially sustaining the weight of the electric motor and intermediate driving gearing.

4. The combination, with a power machine, of a conjointly suspended electric motor and independent intermediate driving gearing, frictional power transmission means interposed directly between said intermediate gearing and the driving pulley or part of the power machine, and a treadle lever connection to the suspended motor and intermediate driving gearing.

5. The combination, with a power machine, of a conjointly suspended electric motor and independent intermediate driving gearing, frictional power transmission means interposed directly between said intermediate gearing and the driving pulley or part of the power machine, a treadle lever connection to the suspended motor and intermediate driving gearing, and an elastic buffer device partially sustaining the weight of the electric motor and intermediate driving gearing.

6. The combination, with a power machine, of a pivoted platform, an electric motor and independent intermediate driving gearing sustained thereon, and a belt connecting said intermediate gearing directly with a driving pulley of the power machine.

7. The combination, with a power machine, of a pivoted platform, an electric motor and independent intermediate driving gearing sustained thereon, a driving belt connecting said intermediate gearing directly with a driving pulley of the power machine, and a treadle lever connection to the pivoted platform.

8. The combination, with a power machine, of a pivoted platform, an electric motor and independent intermediate driving gearing sustained thereon, a driving belt connecting said intermediate gearing directly with a driving pulley of the power machine, a treadle lever connection to the pivoted platform, and an elastic buffer next the treadle lever and sustaining part of the weight of the motor and the intermediate driving gearing.

9. The combination, with a power machine, of a pivoted platform having an adjustable stop or detent limiting its downswing, an electric motor and independent intermediate driving gearing sustained on said platform, and frictional power transmission means interposed directly between said intermediate gearing and the driving pulley or part of the power machine.

10. The combination, with a power machine, of a pivoted platform, an electric motor and primary driving gearing sustained thereon, said gearing comprising a driving pulley and speed reducing worm gearing interposed between the electric motor shaft and said pulley; and a power transmitting belt running from said driving pulley to a driving pulley of the power machine.

11. The combination, with a power machine, of a pivoted platform, an electric motor and intermediate driving gearing sustained on said platform, belt guides on the power machine frame, a belt running from the work spindle or spindles of the power machine over said guides to the driving pulley of the electric motor, and an elastic expanding medium interposed between the pivoted platform and the power machine frame and lifting the platform to tighten the driving belt.

In testimony whereof I affix my signature in the presence of two witnesses.

ERNST RICHTER.

Witnesses:
GUSTAV STENZEL,
MAX WAGNER.